March 28, 1933.  A. ARATO  1,902,819

BRAKE CONTROL FOR VEHICLE WHEELS

Filed Nov. 12, 1930

Inventor:-
Achille Arato

Patented Mar. 28, 1933

1,902,819

UNITED STATES PATENT OFFICE

ACHILLE ARATO, OF TURIN, ITALY

BRAKE CONTROL FOR VEHICLE WHEELS

Application filed November 12, 1930, Serial No. 495,260, and in Italy November 25, 1929.

This invention has for its object a device for automatic control of brakes in a trailer, adapted to apply said brakes at the time said trailer tends to move towards the leading vehicle connected therewith.

In the device of this invention a draft bar interconnecting adjacent vehicles is connected with a vehicle draft member which is mounted in the vehicle frame and is held by resilient means in a normal intermediate position, and the brake actuating gear is connected with a thrust operated member located opposite said draft member; by this arrangement said resilient means while resiliently transmitting the draft in normal running make the brake gear operative when said vehicles tend to approach each other.

This invention also comprises the provision of a resilient draft member of the character above referred to at each end of the vehicle and brake operating means which may be made operative from either or both draft members without interference of the same on each other.

On the annexed drawing is shown by way of example an embodiment of this invention and Figure 1 is a side view of a trailer having the device of this invention;

Figure 1:
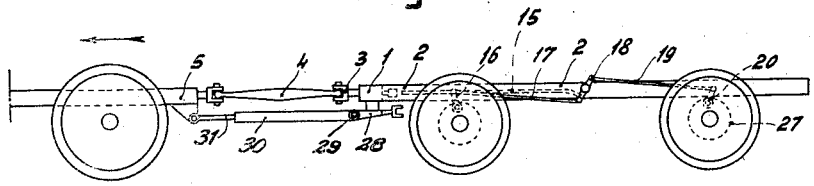
Figure 2:
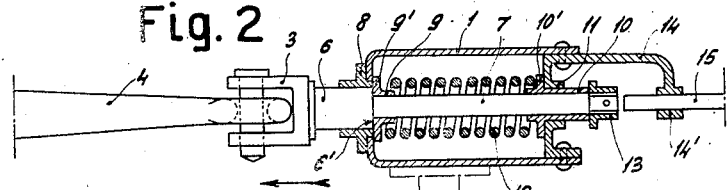
Figure 2 is a section of the draft member on an enlarged scale.

In the construction of Figures 1 and 2, in the hollow or box-like front transverse header 1 of the vehicle frame 2 is mounted to slide a draft member comprising a forked eye 3 with which the draft bar 4 connected with the leading vehicle 5 is engaged. Said eye 3 is connected with a stem 6 which provides a rod 7 having a smaller diameter than said stem and extending throughout said header 1 and beyond the rear of the same. Stem 6 is guided through a collar 8 fastened on header 1 while said rod 7 slides through a collar 9 loose on rod 7 adjacent to shoulder 6' intermediate stem 6 and rod 7, and a further collar 10 loose in a guiding seat 11 of header 1.

A compression spring 12 is located intermediate flanges 9'—10' of collars 9 and 10 said spring forcing said collars against opposite parts of said hollow header 1; on the rear end of rod 7 a nut 13 is screwed which abuts on collar 10 and may engage the stationary guide 11 of the header. Opposite the end of rod 7 and at a short distance from its normal position shown on the drawing a thrust bar 15 is guided to reciprocate longitudinally through a guide 14' of arm 14, said thrust bar 15 being connected with an arm 18 fulcrumed on the vehicle frame 2 to actuate the brake gear which comprises a brake arm 16, rod 17, double arm 18, rod 19 and brake arm 20 as well as conventional brake shoes (not shown) operative on brake drums 27 and subject to brake release springs (not shown).

For steering purposes the vehicle 2 is provided with a yoke 28 pivoted in the header 1 and intended to be connected with the arms of the steering wheels. With said yoke 8 is articulated at 29 a steering bar 30 in which a rod 31, articulated with the rear transverse bar of the leading vehicle is engaged with longitudinal play, said rod 31 for example extending in a longitudinal bore of said bar 30.

When the leading vehicle 5 produces a draft on eye 3 of the trailer by the intermediary of draft bar 4, said eye 3 with stem 6 and rod 7 tends to move forward with respect to header 1 in the direction of arrow in Figure 1 due to resistance of trailed vehicle against running, and then nut 13 acts on the end of collar 10 and this collar in turn by its flange 10' forces spring 12 against flange 9' of collar 9 which abuts against internal surface of the front part of the header 1. Said displacement is stopped when nut 13 engages the stationary guide 11 and then the trailing action is imparted directly to header 1.

In this operation thrust bar 15 is not actuated because rod 7 recedes therefrom and said bar 15 is held by brake shoe release springs in the illustrated position.

On the contrary when the trailer tends to move towards the leading vehicle, header 1 slides forward towards the draft bar 4 and then while collar 8 slides along stem 6 the rear part of header 1 engages flange 10' of collar 10 and causes said collar 10 to move towards collar 9 which abuts on shoulder 6'; such a displacement is damped by spring 12 which is thus compressed, but it causes the thrust bar 15 carried by the vehicle frame to move towards the end of rod 7 and therefore said thrust bar 15 is caused to move towards inside of frame 2 and it applies the brakes by the intermediary of described gear 16, 17, 18, 19, 20.

As soon as the several actions are again balanced, the draft member 3, 6, 7 under action of spring 12 takes again up its normal intermediate position and then brakes are released by their release springs.

Figure 3:
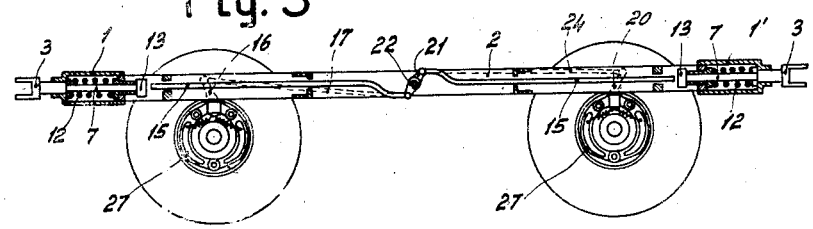
Figure 3 is a diagrammatic section of a vehicle with brake actuating means at both ends.
Figure 4:
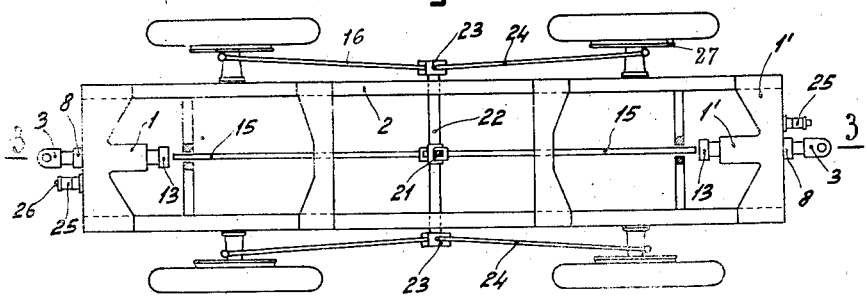
Figure 4 is a plan view of the same.

Figures 3 and 4 illustrate the provision of the described device on both headers 1—1' of a vehicle; in this construction duplicate thrust bars 15 act on opposed ends of an arm 21 solid with rock shaft 22 which through arms 23 solid therewith actuates the rods 24 attached to brake gears of four wheels.

As the actuation of thrust bars 15 by draft members 3, 6, 7 may take place only on account of a thrust action, the whole brake gear is made operative when either of said draft members moves rearwardly with respect to respective header, without interference by the other draft member which is in its normal position or is moved out from its header should it trail a following vehicle.

Figure 5:
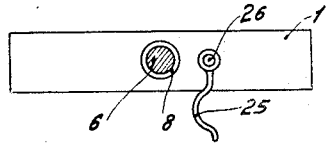
Figure 5 is a diagrammatic view of a brake lock for reverse running.

To secure the reverse running the draft member which in such reverse running receives a thrust is locked against rearward motion towards cooperating thrust bar 15; for such a purpose a lock member (Figure 5) consisting of a part 25 adapted to be positioned intermediate eye 3 and respective stationary guide collar 8 is fulcrumed at 26 in headers 1 and 1', it being inserted intermediate stationary collar 8 and fork eye 3 of said draft member to prevent the inward motion of draft member 3, 6, 7 when a thrust is applied on said member 3.

What I claim as my invention and desire to secure by United States Letters Patent is:—

1. In a device for automatic control of the brakes of a trailer on said trailer approaching a leading vehicle, a draft member resiliently mounted to reciprocate in a support in the frame of said trailer, brake gears on said trailer, an oscillating member connected with said brake gears for their actuation, and a bar supported in the trailer frame and adapted to move along its own axis, said bar having one end connected with said brake gear actuating member and its other end opposite to and spaced from the inner end of said draft member.

2. In a device for automatic control of the brakes of a trailer on said trailer approaching a leading vehicle, a draft bar mounted in a support in the trailer frame to reciprocate along its own axis, resilient means holding said draft bar in an inoperative position, brake gears on said trailer, an oscillating member connected with said brake gears for their actuation, and a bar supported in the trailer frame and adapted to move along its own axis, said bar having one end connected with said brake gear actuating member and its other end opposite to and spaced from the inner end of said draft bar.

3. In a device for automatic control of the brakes of a trailer on said trailer approaching a leading vehicle, a draft member resiliently mounted to reciprocate in a support in the frame of said trailer, brake gears on said trailer, actuating means for said brake gears, a transverse shaft mounted to oscillate in said trailer frame, radial arms fastened on said shaft, a portion of said arms being connected with said brake gears actuating means, and a bar supported in the trailer frame and adapted to move along its own axis, said bar having one end connected with one of said arms of said transverse shaft and its other end opposite to and spaced from the inner end of said draft member.

4. In a device for automatic control of the brakes of a trailer on said trailer approaching a leading vehicle, headers upon said trailer, a draft member resiliently mounted to reciprocate in each header of the trailer, a transverse shaft mounted to oscillate in said trailer frame, radial arms on said shaft, brake gears on said trailer, actuating means for said brake gears, said brake gears actuating means being connected with some of said arms, and two bars each supported in the trailer frame to move along its own axis, said bars having each one end connected with an arm of said transverse shaft and its other end opposite to and spaced from the internal end of one of said draft members and said shaft arms having said bars connected therewith being diametrically opposed to each other.

In testimony whereof I have signed my name to this specification.

ACHILLE ARATO.